US008101912B2

(12) United States Patent
Yamaguchi et al.

(10) Patent No.: US 8,101,912 B2
(45) Date of Patent: Jan. 24, 2012

(54) IMAGE-TAKING APPARATUS AND METHOD THEREOF

(75) Inventors: Kazunori Yamaguchi, Kanagawa (JP); Tsutomu Harada, Kanagawa (JP); Mitsuru Tateuchi, Kangawa (JP); Ryoichi Tsuzaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/276,608

(22) Filed: Nov. 24, 2008

(65) Prior Publication Data

US 2009/0134328 A1 May 28, 2009

(30) Foreign Application Priority Data

Nov. 27, 2007 (JP) ................................. 2007-306318

(51) Int. Cl.
*H01L 25/00* (2006.01)
(52) U.S. Cl. .................... 250/332; 250/370.08
(58) Field of Classification Search .................. 250/330, 250/332, 578.1, 370.08
See application file for complete search history.

(56) References Cited

U.S. PATENT DOCUMENTS

| 7,147,153 | B2* | 12/2006 | Rowe et al. ................... 235/382 |
| 7,550,707 | B2* | 6/2009 | Hashimoto et al. ........... 250/221 |
| 7,692,774 | B2* | 4/2010 | Sato ................................ 356/71 |
| 7,876,929 | B2* | 1/2011 | Matsumura et al. .......... 382/115 |
| 2003/0047683 | A1* | 3/2003 | Kaushal ......................... 250/330 |
| 2004/0169617 | A1* | 9/2004 | Yelton et al. ................... 345/1.1 |
| 2009/0218527 | A1* | 9/2009 | French et al. ............. 250/578.1 |

FOREIGN PATENT DOCUMENTS

| JP | 2004-049705 | 2/2004 |
| JP | 2005-191749 | 7/2005 |
| JP | 2006-095056 | 4/2006 |
| JP | 2007-048113 | 2/2007 |
| JP | 2007-299084 | 11/2007 |
| WO | 2006/038276 A1 | 4/2006 |

* cited by examiner

*Primary Examiner* — David Porta
*Assistant Examiner* — Faye Boosalis
(74) *Attorney, Agent, or Firm* — K&L Gates LLP

(57) ABSTRACT

An image-taking apparatus includes an image-taking device configured to take an image of an object, at least one illumination light source configured to be able to illuminate the object, an illumination region controller configured to be able to partially emit an illumination light ray originating from the illumination light source towards a plurality of different regions of the object, and to sequentially change the location of an illuminated area of the illumination light ray, and a controller configured to cause the image-taking device to take an image of the object under a plurality of illumination conditions produced in accordance with control of the illumination region controller.

16 Claims, 16 Drawing Sheets

OBTAINED IMAGE

ILLUMINATION LIGHT SOURCE

IMAGE-TAKING APPARATUS AND METHOD THEREOF

CROSS REFERENCES TO RELATED APPLICATIONS

The present application claims priority to Japanese Patent Application JP 2007-306318 filed in the Japanese Patent Office on Nov. 27, 2007, the entire contents of which is incorporated herein by reference.

BACKGROUND

The present application relates to an image-taking apparatus and a method thereof. More specifically, the image-taking apparatus and method thereof of the present application allow obtaining of a plurality of images under different illumination conditions, and is applicable to apparatuses for performing biometric authentication by taking an image of a portion of a living-body, such as fingerprints, finger veins or palm veins.

A method for taking an image of finger veins of a living-body in the direction towards the ball of a finger, under the condition where the back of the finger is substantially perpendicularly illuminated, has been proposed (refer to, for example, Japanese Unexamined Patent Application Publication No. 2004-49705).

FIG. 1 is a schematic diagram depicting an example of the method for taking an image of the finger veins in the direction towards the ball of the finger under the condition where the back of the finger is substantially perpendicularly illuminated by infrared LEDs used as an illumination light source, as disclosed in Japanese Unexamined Patent Application Publication No. 2004-49705.

In this case, infrared LEDs 1, 2 and 3 are used as the illumination light source, and further, in the direction towards the ball of the finger, which is an object OBJ, an image made of light rays transmitted through the finger, which result from emission of light rays by the illumination light sources, is taken by an image-taking device 4.

Moreover, a method for taking an image of the finger veins of a living-body in the direction towards the ball of the finger, under the condition where the side surface of the finger is substantially perpendicularly illuminated, has been proposed (refer to, for example, Japanese Unexamined Patent Application Publication No. 2006-95056).

Further, a method for taking an image of the finger veins of a living-body in the direction towards the ball of the finger, under the condition where the ball of the finger is substantially perpendicularly illuminated, has been proposed (refer to, for example, Japanese Unexamined Patent Application Publication No. 2004-49705).

FIG. 2 is a schematic diagram depicting an example of the method for taking an image of the finger veins in the direction towards the ball of the finger under the condition where the ball of the finger is substantially perpendicularly illuminated by infrared LEDs used as an illumination light source, as disclosed in Japanese Unexamined Patent Application Publication No. 2004-49705.

In this case, a plurality of LEDs, the number of which is two in the example shown in FIG. 2, used as the illumination light source, are located at the side of the image-taking device 4, and an image made of light rays transmitted through the object OBJ, which is the finger of the living-body, which result from reflection of light rays inside the finger, is taken by the image-taking device 4.

SUMMARY

However, even in the first method disclosed in Japanese Unexamined Patent Application Publication No. 2004-49705, since the installation of certain mechanisms at the upper and lower sides of the finger is necessary, it is difficult to suppress an increase in the size of the image-taking apparatus.

Further, in the method disclosed in Japanese Unexamined Patent Application Publication No. 2006-95056, so that a mechanical problem, in which, mounting of the image-taking apparatus into apparatuses targeted for incorporation of the image-taking apparatus will lead to projecting of the outline of the image-taking apparatus out of the frame of the apparatuses targeted for incorporation, can be compensated, a lot of restrictions are imposed on the mechanical structure of the apparatuses targeted for incorporation.

On the other hand, in the second method disclosed in Japanese Unexamined Patent Application Publication No. 2004-49705, it is possible to prevent the mechanical problem as described above; however, there are other problems that, since the illumination light rays return back subsequent to transmitting inside the finger, brightness of the image becomes low at the center of the image-taking device located remote from the illumination light sources. Further, in the case where the image-taking apparatus is used by a plurality of individuals, it is likely not to be able to obtain clear images due to fluctuations in placements of the fingers performed by the individuals and also differences in light transmission factors inside the individuals' fingers.

In view of the foregoing, the present inventors have recognized that it is desirable to provide an image-taking apparatus and a method thereof, in which, regardless of non-uniform conditions associated with an object, it is enabled to allow the illumination light rays emitted from the side of the image-taking device to cover across all regions of the object.

According to an embodiment, there is provided an image-taking apparatus which includes an image-taking device configured to take an image of an object, at least one illumination light source configured to be able to illuminate the object, an illumination region controller configured to be able to partially emit an illumination light ray originating from the illumination light source towards a plurality of different regions of the object, and to sequentially change the location of an illuminated area of the illumination light ray, and a controller configured to cause the image-taking device to take an image of the object under a plurality of illumination conditions produced in accordance with control of the illumination region controller.

Preferably, the image-taking apparatus includes an image combination section configured to combine a plurality of images taken by the image-taking device.

Preferably, the image-taking apparatus includes a plurality of illumination light sources, wherein the illumination region controller changes the location of the illuminated area of the illumination light ray by sequentially switching each of the plurality of illumination light sources into a light emitting condition or a non-light emitting condition.

Preferably, the controller causes the image-taking device to take an image of the object under each of the plurality of different illumination conditions.

Preferably, the image-taking apparatus includes only one illumination light source located at the side of the image-taking device, wherein the illumination region controller includes a mechanism capable of performing control so as to selectively transmit or shield the illumination light ray originating from the illumination light source.

Preferably, the illumination region controller can change a distance between centers of the illuminated area through which the illumination light ray is emitted onto the object and a non-illuminated area through which none of the illumination light ray is emitted onto the object.

Preferably, the controller can arbitrarily change a clipping range of each of the plurality of images used for the combination.

Preferably, the image-taking device includes an image display device including an effective display region, in which, display cells each having a light transmitting condition capable of being controlled, and light-sensitive cells each having a light-sensitive element, are arranged in matrixes, respectively, and produces an image from light signals received by the light-sensitive cells.

Preferably, the image display device has a backlight, and a function of the illumination light source is commonly provided by the backlight.

Preferably, the illumination light ray originating from the illumination light source includes an infrared light ray, the object is a group of veins of a living-body, and the illumination light source is located at the side of the image-taking device opposite the object.

An image-taking method according an embodiments, which uses an image-taking device configured to take an image of an object, and at least one illumination light source configured to be able to illuminate the object, includes the steps of partially emitting an illumination light ray originating from the illumination light source towards a plurality of different regions of the object, sequentially changing the location of an illuminated area of the illumination light ray, and causing the image-taking device to take an image of the object under a plurality of illumination conditions.

According to an embodiment, the different illumination conditions can be produced by causing the illumination region controller to selectively change, for example, respective light emitting conditions and/or light intensities of the illumination light source. Thus, by causing the illumination region controller to sequentially change the location of the illuminated area of the illumination light ray, a plurality of different illumination conditions can be produced. Then, respective images of the object under the plurality of different illumination conditions are taken by the image-taking device, and as a result, a plurality of images are obtained. Subsequently, data of the plurality of images are processed to be combined into an image.

Additional features and advantages are described herein, and will be apparent from the following Detailed Description and the figures.

DETAILED DESCRIPTION

An embodiment according to the present application will be described below with reference to the accompanying drawings.

Figure 1:
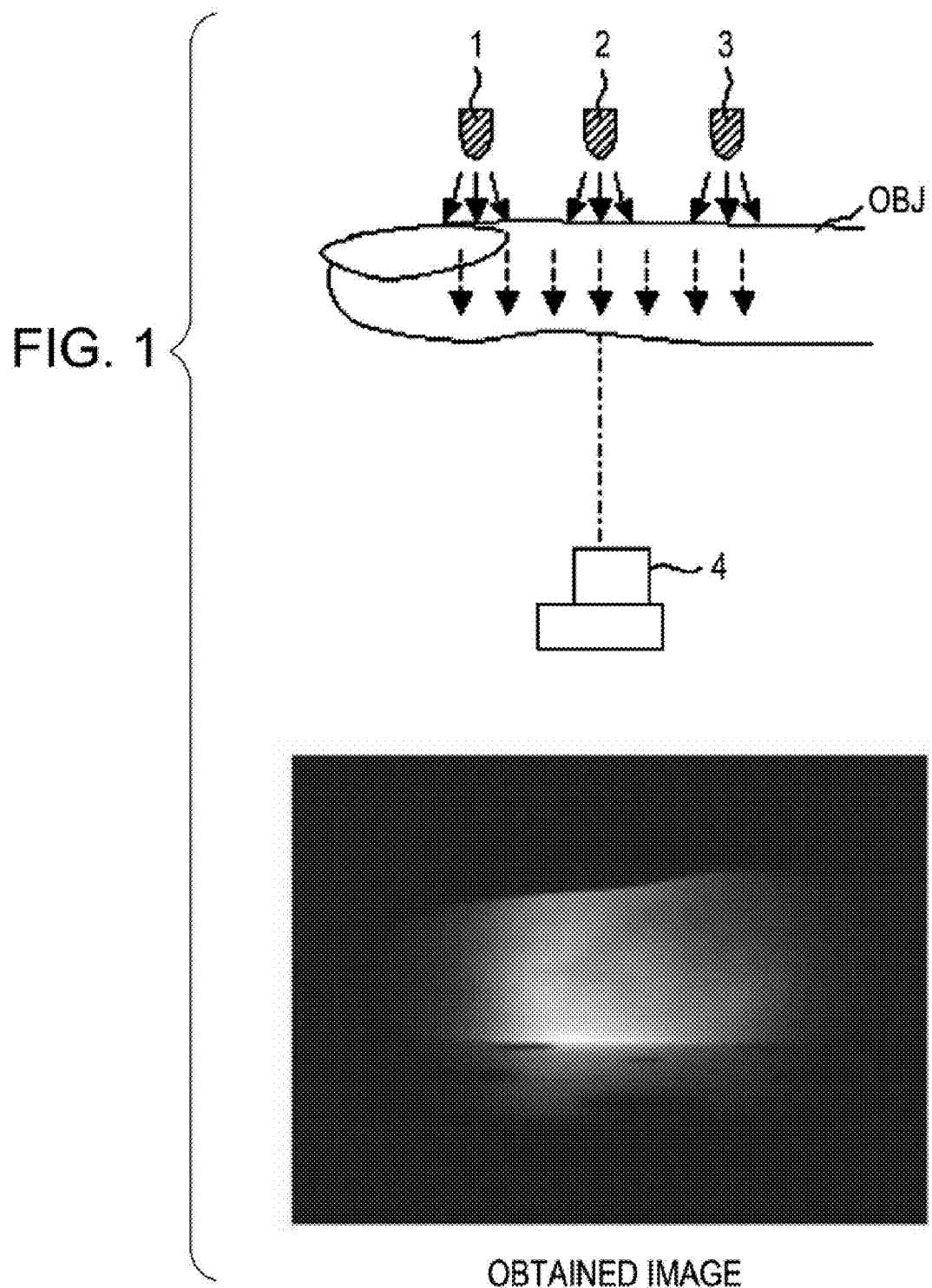
FIG. 1 is a schematic diagram depicting an example of a method for taking an image of finger veins in the direction towards a ball of the finger under the condition where the back of the finger is substantially perpendicularly illuminated by infrared LEDs used as an illumination light source, as disclosed in Japanese Unexamined Patent Application Publication No. 2004-49705.
Figure 2:
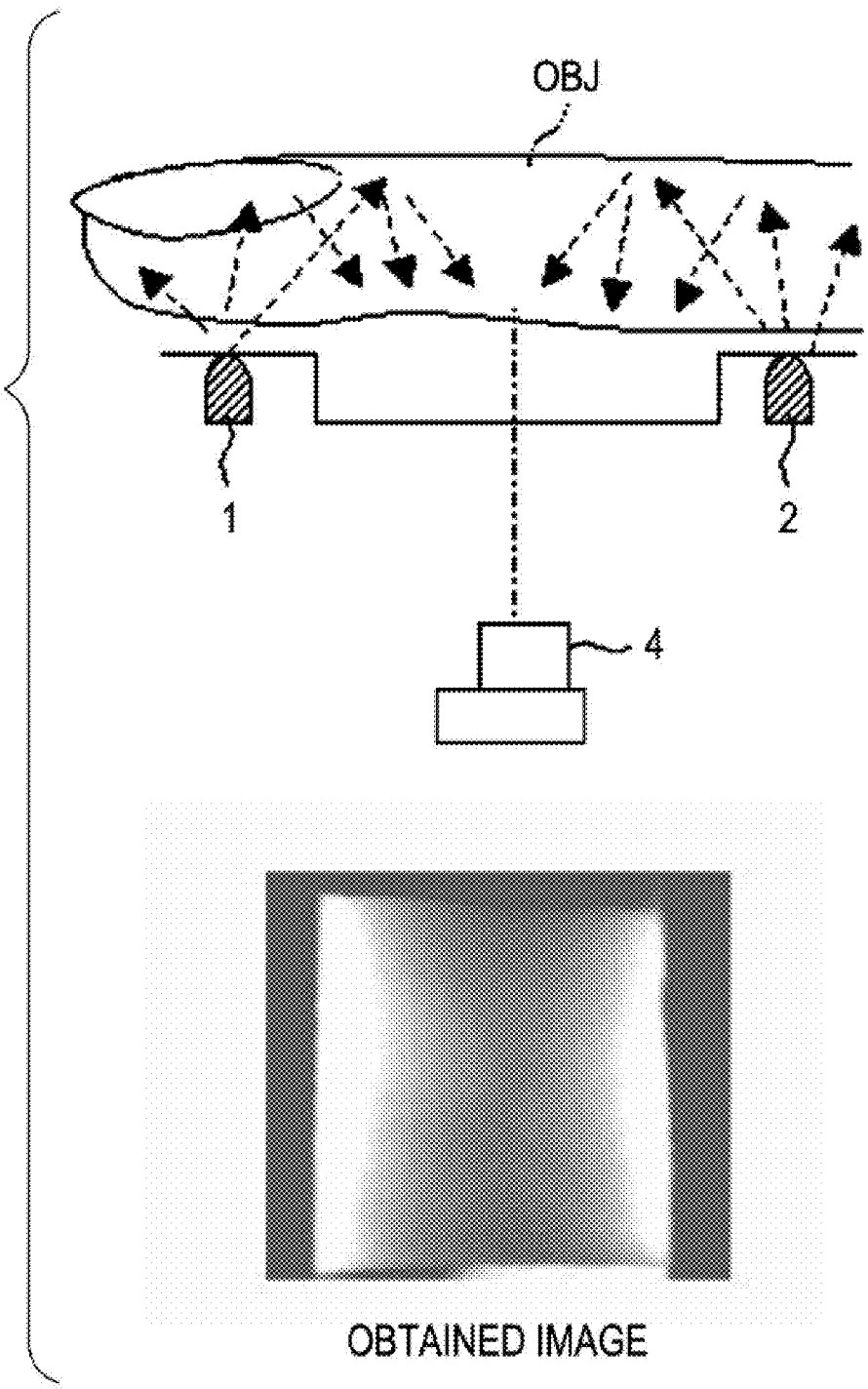
FIG. 2 is a schematic diagram depicting an example of a method for taking an image of finger veins in the direction towards a ball of the finger under the condition where the ball of the finger is substantially perpendicularly illuminated by infrared LEDs used as an illumination light source, as disclosed in Japanese Unexamined Patent Application Publication No. 2004-49705.
Figure 3:
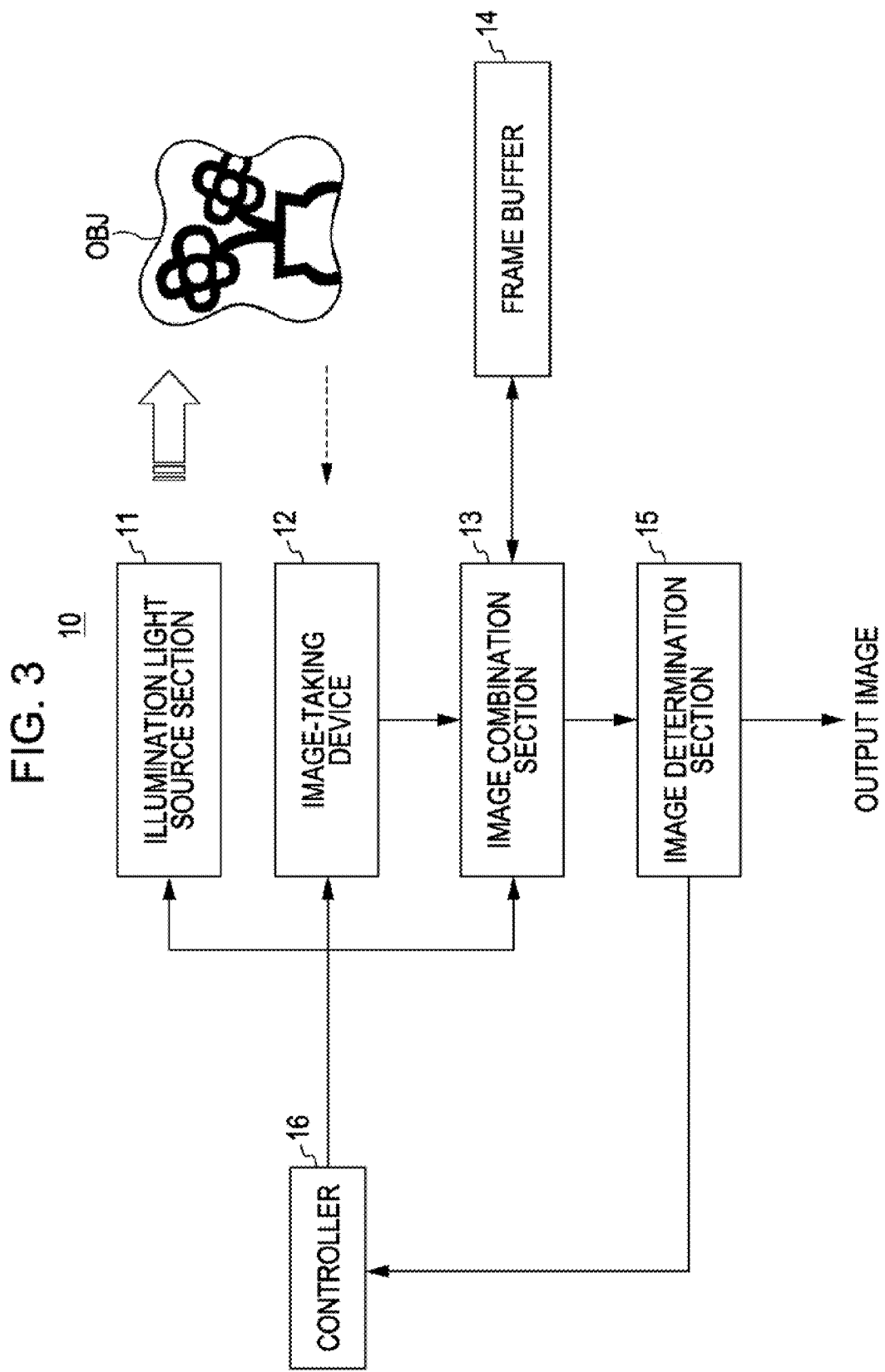
FIG. 3 is a block diagram depicting an example of a configuration of an image-taking apparatus according to a first embodiment.

FIG. 3 is a block diagram depicting an example of a configuration of an image-taking apparatus according to a first embodiment.

Figure 4:
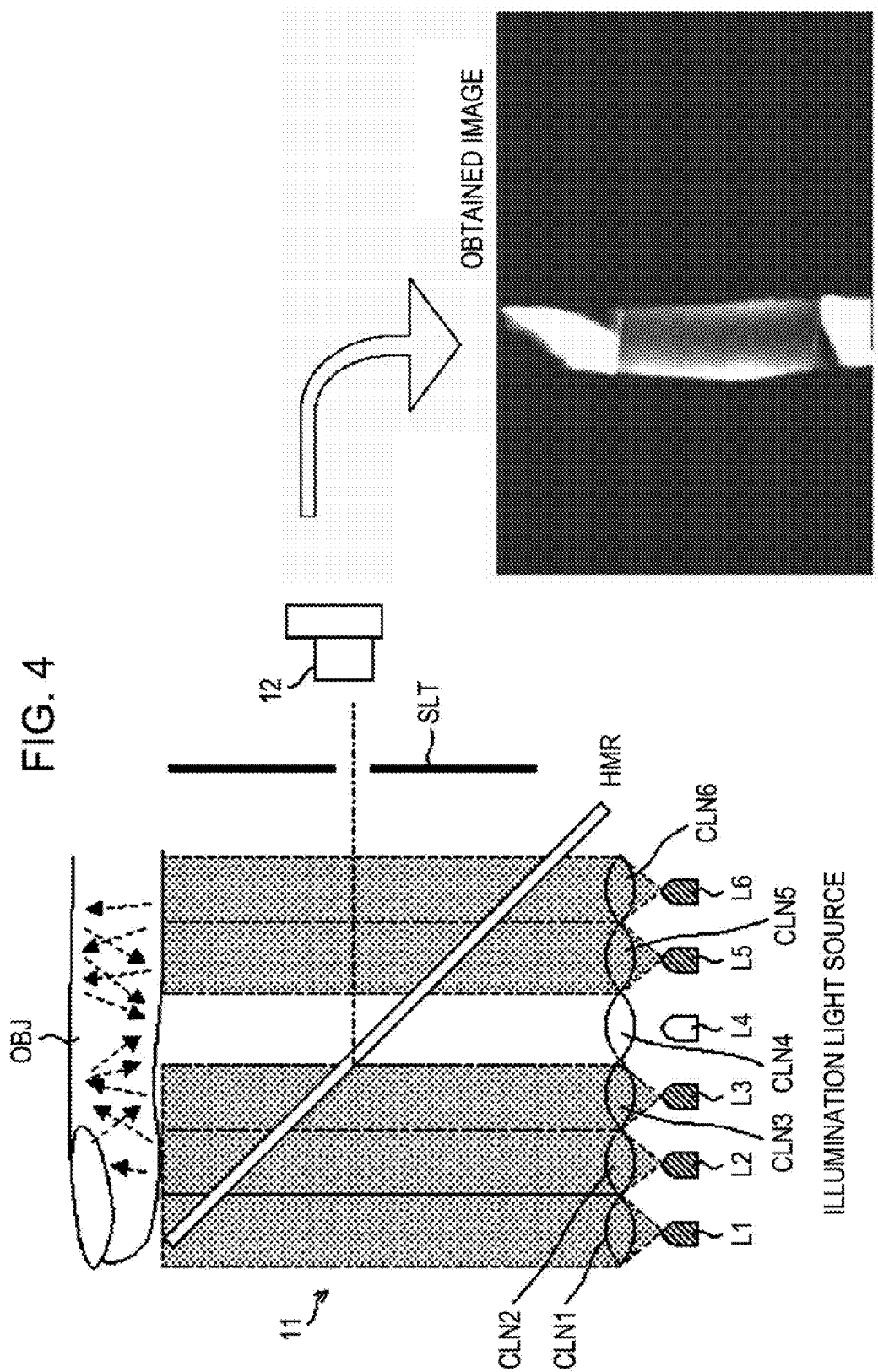
FIG. 4 is a diagram depicting relations among illumination light sources, an image-taking device and an object, according to a first embodiment n.

FIG. 4 is a diagram depicting relations among illumination light sources, an image-taking device and an object, according to the first embodiment.

As shown in FIG. 3, the image-taking apparatus 10 includes an illumination light source section 11, an image-taking device 12, an image combination section 13, a frame buffer 14, an image determination section 15, and a controller 16 including a function of image-taking area controller.

The illumination light source section 11 includes a plurality of light sources (the number of which is six in an example shown in FIG. 4) L1 to L6, composed of, for example, LEDs each emitting an infrared light ray, collimation lenses CLN 1 to CLN 6 for converting respective light rays originating from the light sources L1 to L6 into collimated light rays, and emitting the collimated light rays to respective different regions of the object, i.e., the ball of the finger, and a half mirror HMR for, basically, transmitting the collimated illumination light rays therethrough, resulting from conversion of the light rays originating from the light sources L1 to L6 performed by the collimation lenses CLN 1 to CLN 6, emitting the collimated illumination light rays towards the object, i.e., the ball of the finger, and reflecting the returning light rays, which have been transmitted through the inside of the object, i.e., the finger, in the direction substantially perpendicular to the light path of the illumination light ray.

The illumination light source section 11, configured as described above, is operative to partially emit the illumination light rays towards a plurality of different regions (locations) in an image taking area of the object OBJ, to be taken by the image-taking device 12.

Moreover, the illumination light source section 11 is operative in such a manner that, under the control of the controller 16, the conditions of turning on and off of the respective light sources L1 to L6 are controlled so that the locations of illuminated areas (or non-illuminated areas) of the illumination light rays can be sequentially changed.

The image-taking device 12 is constituted by a digital camera having image-taking elements composed of CCD or CMOS sensors, and further, every time the conditions of turning on and off of the respective light sources L1 to L6 of the illumination light source section 11 are switched by the controller 16, the image-taking device 12 takes an image of the object via the half mirror HMR in response to a command from the controller 16 for notifying a timing at which the image-taking is to be executed, and then, outputs data of the taken image to the image combination section 13.

The image-taking device 12 takes a plurality of images having different phases resulting from variation of illumination conditions, which are then sent to the image combination section 13.

The image combination section 13 temporally stores the plurality of images having different phases, sent from the image-taking device 12, in the frame buffer 14, and further, under the control of the controller 16, clips an appropriate portion of each image of the plurality of images having different phases, that is specified by the illumination light condition under which the image was taken. Subsequently, the image combination section 13 combines the clipped portions of the plurality of images having different phases into one image, and then, sends the combined image to the image determination section 15.

The image determination section 15 determines whether the quality of the combined image is sufficient, or not, and in the case where the quality of the combined image is sufficient, the image determination section 15 outputs the combined image.

Whereas, in the case where it is determined by the image determination section 15 that the quality of the combined image is not sufficient, in order to obtain another combined image of better quality, the controller 16 performs control of the illumination light source section 11 so as to perform, for example, adjustment of brightness and/or positions of the non-illuminated areas of the light sources, and/or control of the image-taking device 12 so as to perform, for example, adjustment of exposure.

The controller 16 performs control of the whole image-taking apparatus, such as control of turning on/off of the respective light sources in the illumination light source section 11, control of timings of image-taking and outputting of the taken images in the image-taking device 12, and control of processing for storing the plurality of image data in the frame buffer 14 and combining the data of the plurality of images into an image in the image combination section 13.

Further, the controller 16 causes each of the plurality of light sources to emit a light ray, or emit no light ray, towards the plurality of different regions (locations) of the image-taking area of the object, so that a plurality of different illuminated regions, or a plurality of different non-illuminated regions, can be produced.

In the case where it is determined by the image determination section 15 that the quality of the combined image is not sufficient, in order to obtain another combined image of better quality, the controller 16 performs control of the illumination light source section 11 so as to perform, for example, adjustment of brightness and/or positions of the non-illuminated areas of the light sources, and/or control of the image-taking device 12 so as to perform, for example, adjustment of exposure.

In the image-taking apparatus 10 according to an embodiment, basically, an image of the object OBJ is taken by the image-taking device 2 under the conditions where the object OBJ is partially illuminated. Further, a plurality of images of the object, which were taken in conjunction with sequential changing (i.e., shifting) of the location of the illuminated areas of the illumination light rays, are combined by the image combination section 13 into one image.

Moreover, the image-taking apparatus 10 according to an embodiment, which is configured so as to specifically function as an apparatus for taking an image of the finger veins, includes the illumination light source section 11, which is located at the side of the ball of the finger and has a plurality of illumination light sources capable of being turned on or off, individually.

Moreover, the illumination light source section 11 emits a light ray towards the ball of the finger, having therein one or more non-illuminated areas.

Further, the image taking device 12 takes an image of the ball of the finger illuminated in one or more non-illuminated areas, and repeats these operations in conjunction with sequential shifting of the non-illuminated areas performed by the illumination light source section 11.

The plurality of images obtained thereby are combined into one image by the image combination section 13. Thus, in this manner, the image of a portion of a living-body part, such as the finger veins, can be obtained.

In addition, in the image-taking apparatus 10, distances between centers of respective light illuminated areas of the illumination light ray emitted by the illumination light source section 11, as well as clipping ranges of respective images used for the combination, can be arbitrarily changed.

Next, operations performed by the elements described above will be hereinafter described with reference to FIG. 3 to FIG. 5.

As shown in FIG. 4, the illumination light sources L1 to L6, composed of LEDs, are located so as to be paired with the collimation lenses CLN 1 to CLN 6, respectively.

The lights outputted from the respective illumination light sources L1 to L6 are converted into the collimation lights by the collimation lenses CLN 1 to CLN 6, and the resultant collimated lights are emitted towards the object on a region-by-region basis.

Under the control of the controller 16, for example, in the case where the light source L4 is turned off, and the other light sources L1 to L3, L5 and L6 are turned on, the region of the object to be illuminated by the light source L4, which is not illuminated by any light ray, whereas the other regions are illuminated by light rays, is therefore illuminated by light rays from inside of the object, which result from scattering, inside the object, of lights entered from the other regions.

Further, once the image of this condition has been taken by the image-taking device 12, such as a camera, by using the half mirror HMR, it results in acquisition of an image of the region to be illuminated by the light source L4, being indirectly illuminated from inside of the object.

In addition, as shown in FIG. 4, in order that the illuminated image can be easily discriminated, the image associated with only the region corresponding to the light source L4 is obtained by placing a slit SLT at the front of the image-taking device 12; however, this slit may not be used.

Figure 5:
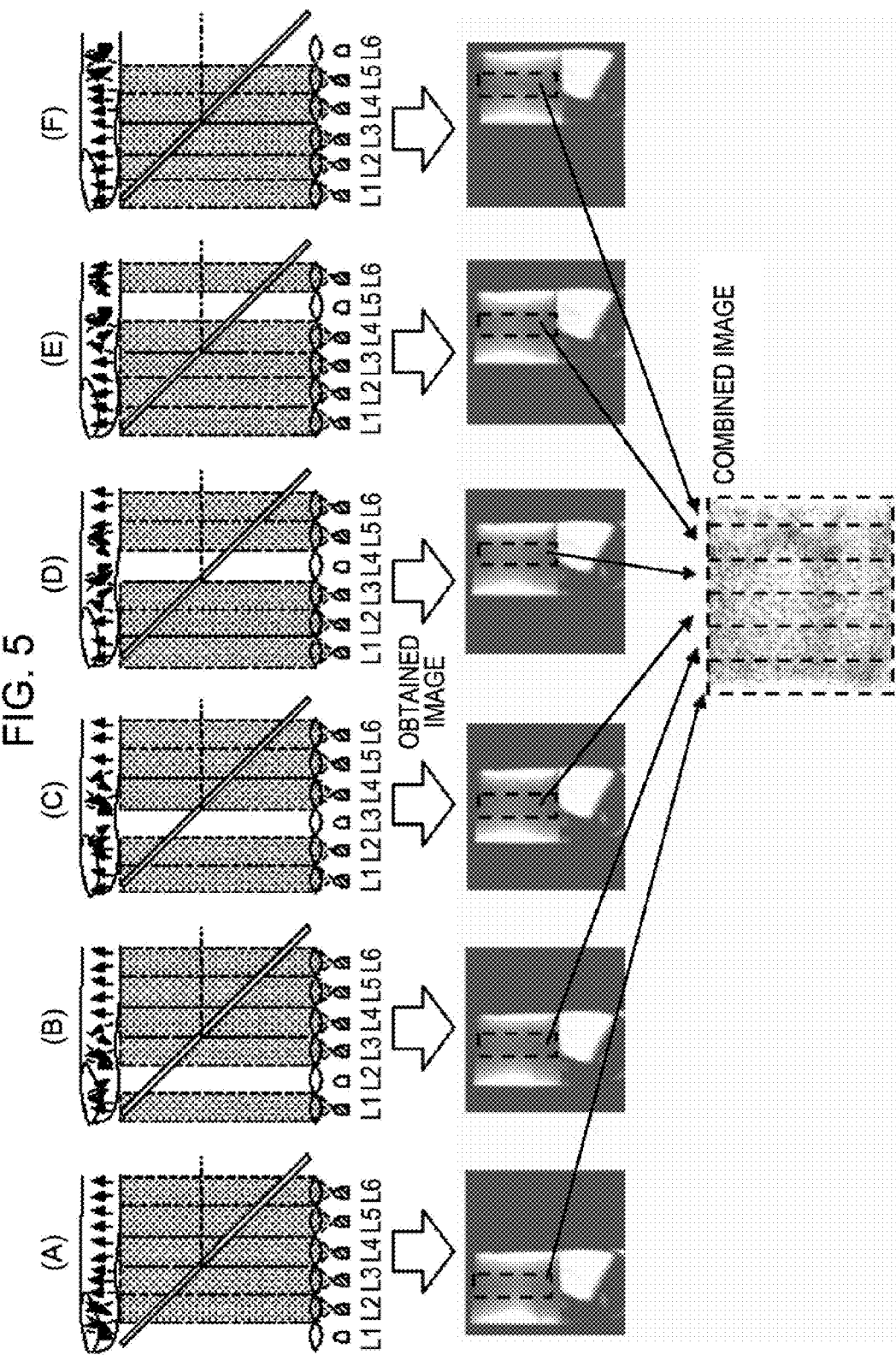
FIG. 5 is a diagram depicting a manner in which respective light sources of LEDs are sequentially turned off.

FIG. 5 is a diagram depicting a manner in which respective light sources of LEDs are sequentially turned off.

In this example, by clipping a portion illuminated from inside of the object, among from each of the images which were taken under the conditions where respective light sources L1 to L6 were sequentially turned off, and combining the clipped portions into one image, it is possible to obtain an image of the object, taken under the condition where every part of the object is illuminated from inside of the object.

In addition, in the example described above, only one of the light sources L1 to L6 is turned off at any one time; however, a plurality of illumination light sources may be simultaneously turned off.

Figure 6:
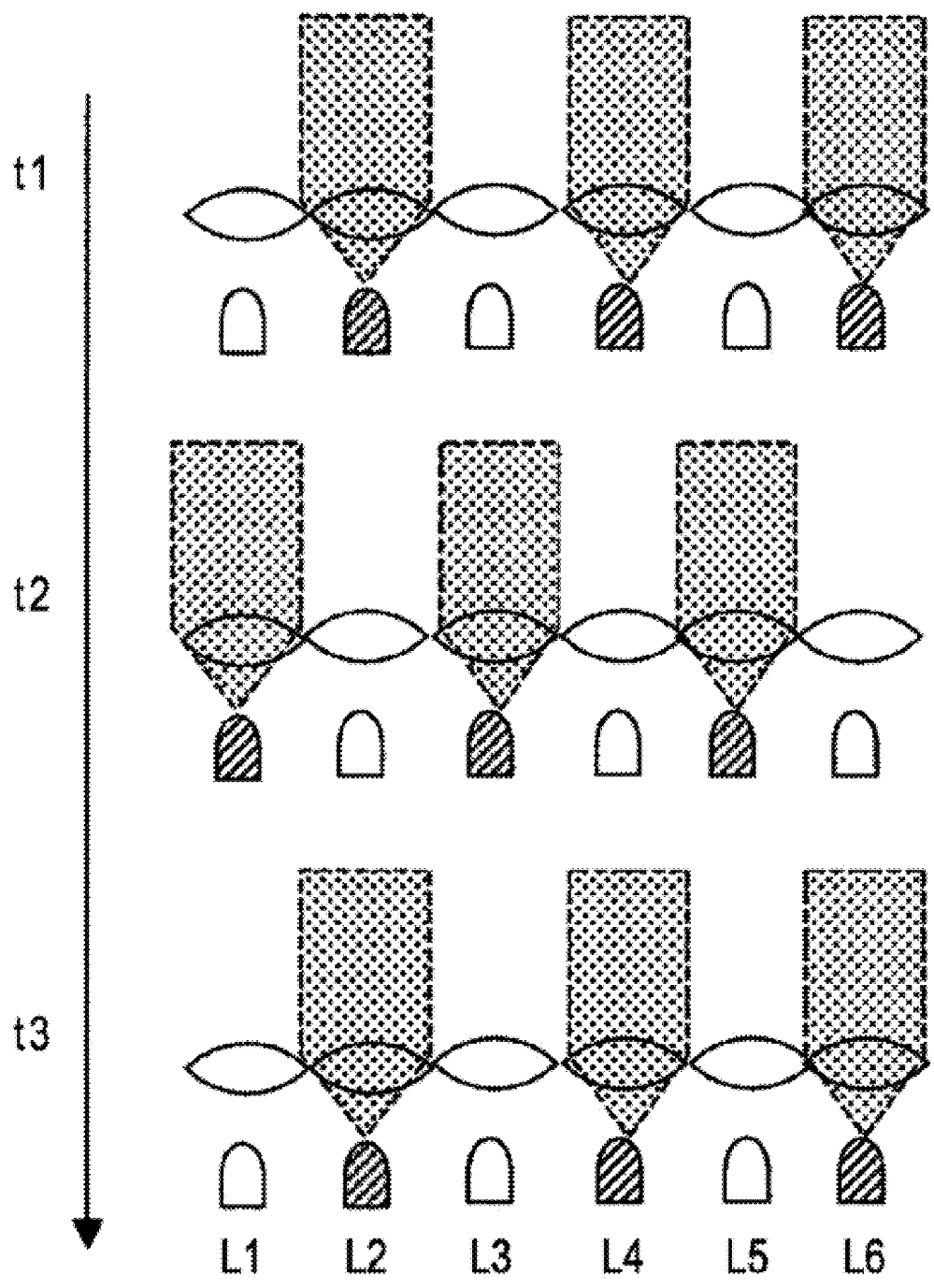
FIG. 6 is a diagram depicting a first example of a case where a plurality of illumination light sources are simultaneously turned off.

FIG. 6 is a diagram depicting a first example of a case where a plurality of illumination light sources are simultaneously turned off.

Figure 7:
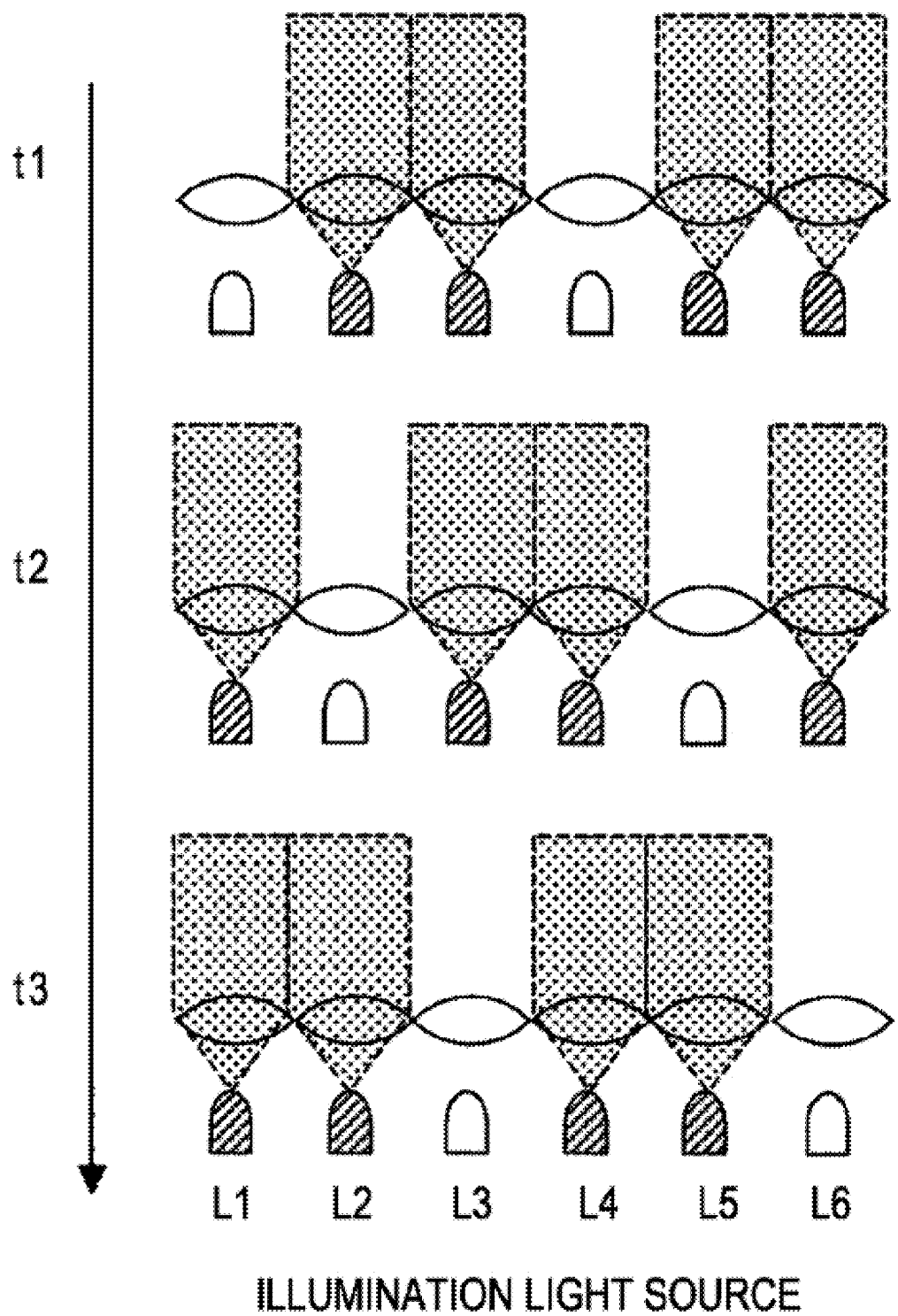
FIG. 7 is a diagram depicting a second example of a case where a plurality of illumination light sources are simultaneously turned off.

FIG. 7 is a diagram depicting a second example of a case where a plurality of illumination light sources are simultaneously turned off.

In the first example shown in FIG. 6, every second illumination light of the plurality of illumination light sources is turned off.

At a time t1, the illumination light sources L1, L3 and L5 are turned off, whereas the illumination light sources L2, L4 and L6 are turned on.

At a time t2, the illumination light sources L1, L3 and L5 are turned on, whereas the illumination light sources L2, L4 and L6 are turned off.

At a time t3, in the same manner as at t1, the illumination light sources L1, L3 and L5 are turned on, whereas the illumination light sources L2, L4 and L6 are turned off.

In such a manner as described with reference to the first example shown in FIG. 6, control is performed so that odd-numbered illumination light sources and even-numbered illumination light sources are alternately turned off and turned on.

In the second example shown in FIG. 7, every third illumination light of the plurality of illumination light sources is turned off.

At a time t1, the illumination light sources L1 and L4 are turned off, whereas the illumination light sources L2, L3, L5 and L6 are turned on.

At a time t2, the illumination light sources L2 and L5 are turned on, whereas the illumination light sources L1, L3, L4 and L6 are turned off.

At a time t3, the illumination light sources L3 and L6 are turned off, whereas the illumination light sources L1, L2, L4 and L5 are turned on.

Moreover, although not shown in any of the drawings, every fourth or every fifth illumination light source may be turned off, and further, illumination light sources may be turned off at random, i.e., not in accordance with a predetermined constant order, only if it can be determined in advance which illumination light sources are to be turned off at a subsequent timing.

Hereinbefore, the first embodiment was described as an example in which a plurality of illumination light sources are used.

Subsequently, a second embodiment will be hereinafter described as an example in which a single illumination light is used.

Figure 8:
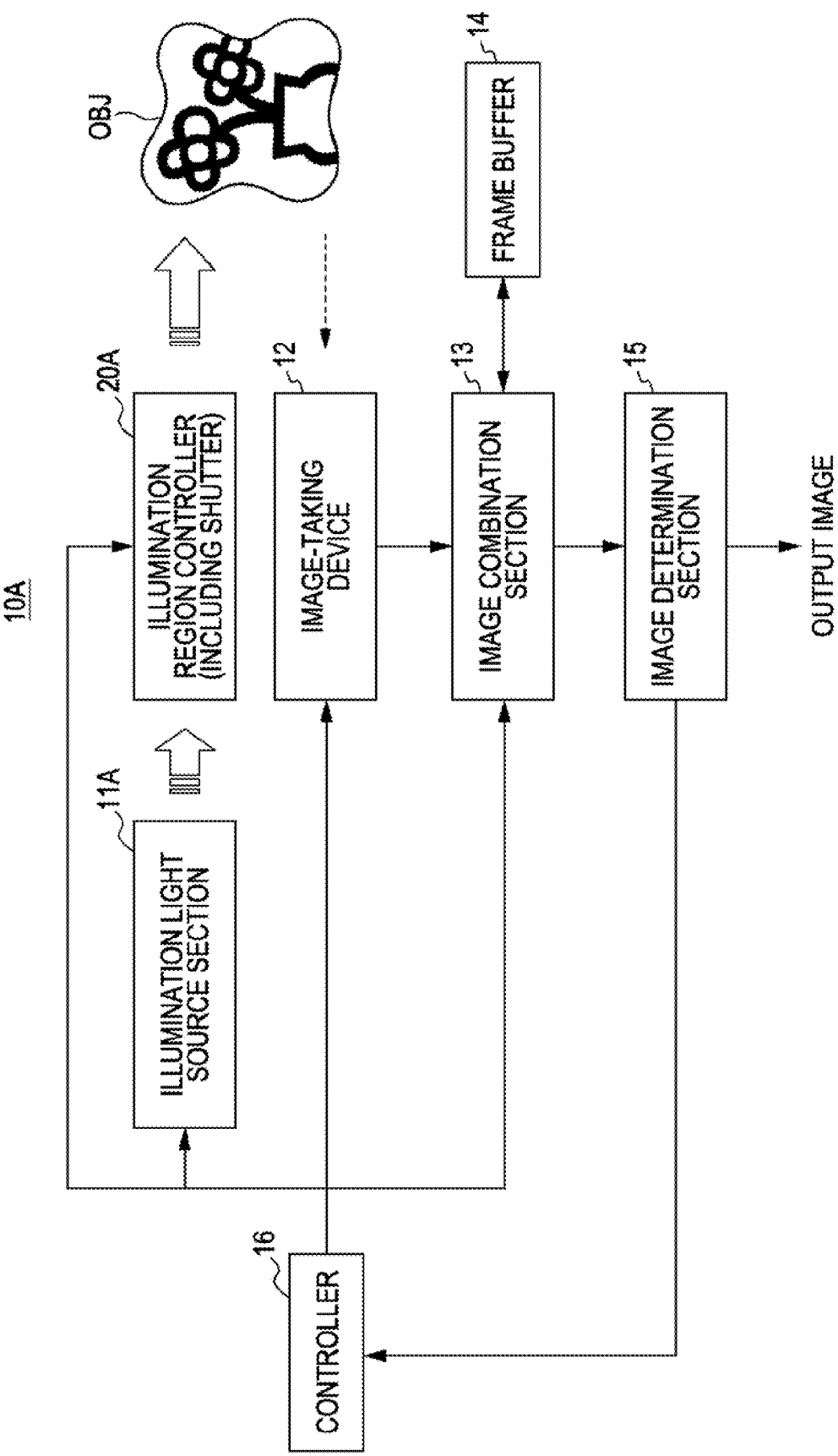
FIG. 8 is a block diagram depicting an example of a configuration of an image-taking apparatus according to a second embodiment.

FIG. 8 is a block diagram depicting an example of a configuration of an image-taking apparatus according to a second embodiment.

Figure 9:
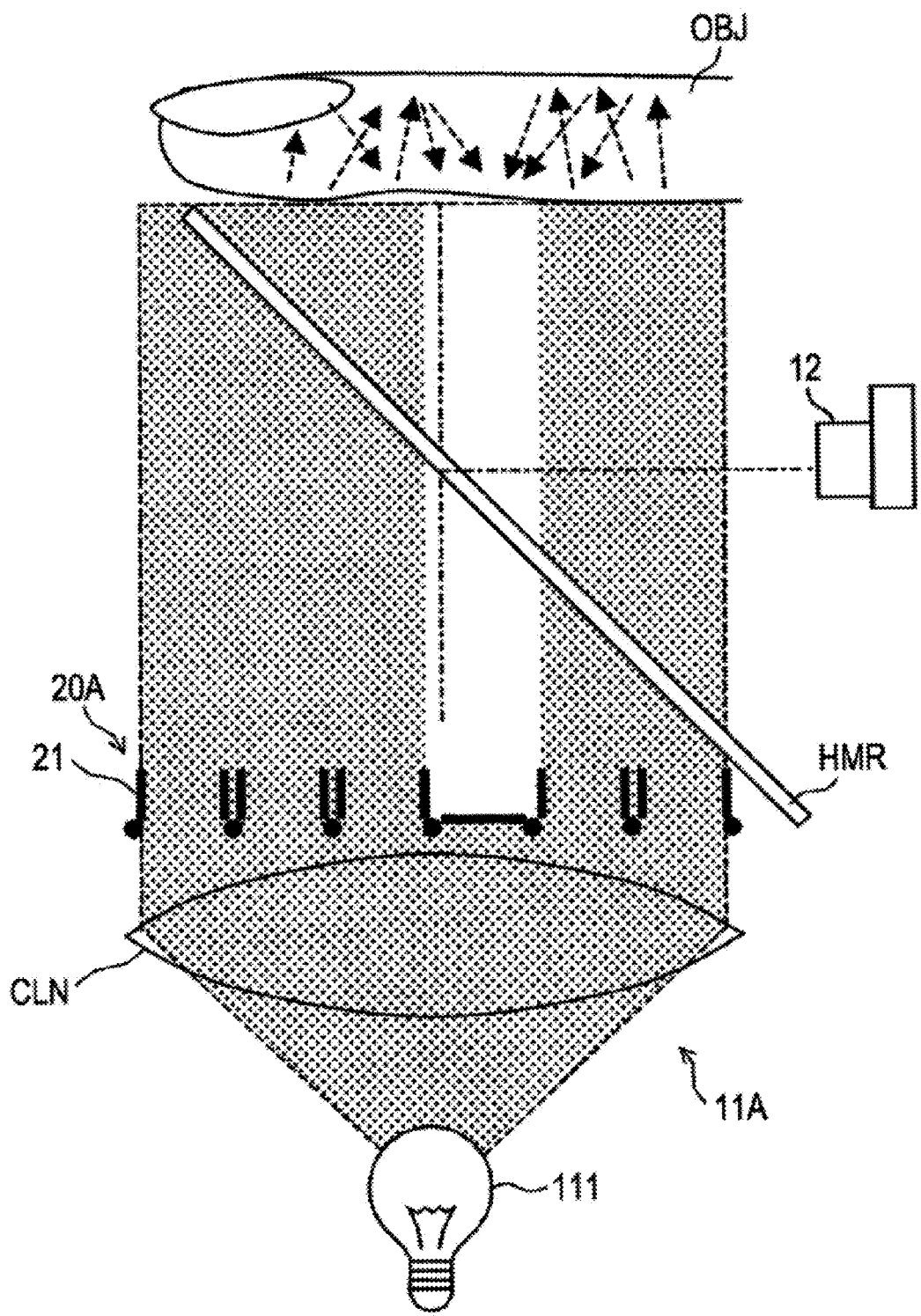
FIG. 9 is a diagram depicting a first example of relations among an object, a taking-image device and an illumination light source including an illumination region controller, according to a second embodiment.

FIG. 9 is a diagram depicting a first example of relations among an object, a taking-image device and an illumination light source including an illumination region controller, according to the second embodiment.

In an image-taking apparatus 10A according to the second embodiment, an illumination light source 11A has only one illumination light source 111, which is constantly turned on, and an illumination region controller 20A having a predetermined number of a plurality of shutters 21 is located between the illumination light source 111 and the object OBJ.

By closing a portion of the shutters 21 of the illumination region controller 20A, just like, as shown in FIG. 4, by turning off one of the plurality of the illumination light sources L1 to L6 composed of LEDs, a region of the object can be controlled so as not to be emitted by an illumination light ray.

In this manner, the non-illuminated region of the object is illuminated by lights scattered inside the object, and it leads to the same as or similar to the advantage described with reference to FIG. 4. By taking images in conjunction with sequentially changing (i.e., shifting) the location of the portion of the shutters being closed, it is possible to perform image-taking and combination in the same as or similar to the manner as described with reference to FIG. 5.

In this configuration, the controller 16 performs control of the illumination light source section 11A so as to emit a light ray for illuminating the object.

Subsequently, the controller 16 performs control of the illumination region controller 20A so as to switch respective portions of the shutter 21 into a condition of passing the illumination light ray, or a condition of shielding the illumination light ray, originated from the illumination light source 111.

Under this condition, an image of the object OBJ is taken by the image-taking device 12 via the half mirror HMR, and data of the image is sent to the image combination section 13.

In the image combination section 13, a relevant portion of the image is clipped in accordance with the condition of the illumination light source 111 under which the image was taken, and then, a plurality of the clipped images, resulting from repetition of the operations as described above, are combined into an image.

The image determination section 15 determines whether the quality of the combined image is sufficient, or not, and in the case where the quality of the combined image is sufficient, the combined image is outputted by the image determination section 15. On the other hand, in the case where it is determined by the image determination section 15 that the quality of the combined image is not sufficient, in order to obtain another image of better quality, the controller 16 performs control of the illumination light source section 11A so as to perform, for example, adjustment of brightness of the illumination light and/or reallocation of light shielding portions of the shutters, and/or control of the image-taking device 12 so as to perform, for example, adjustment of exposure.

Additionally, the configuration of the illumination region controller is not limited to the configuration shown in FIG. 9.

Figure 10:
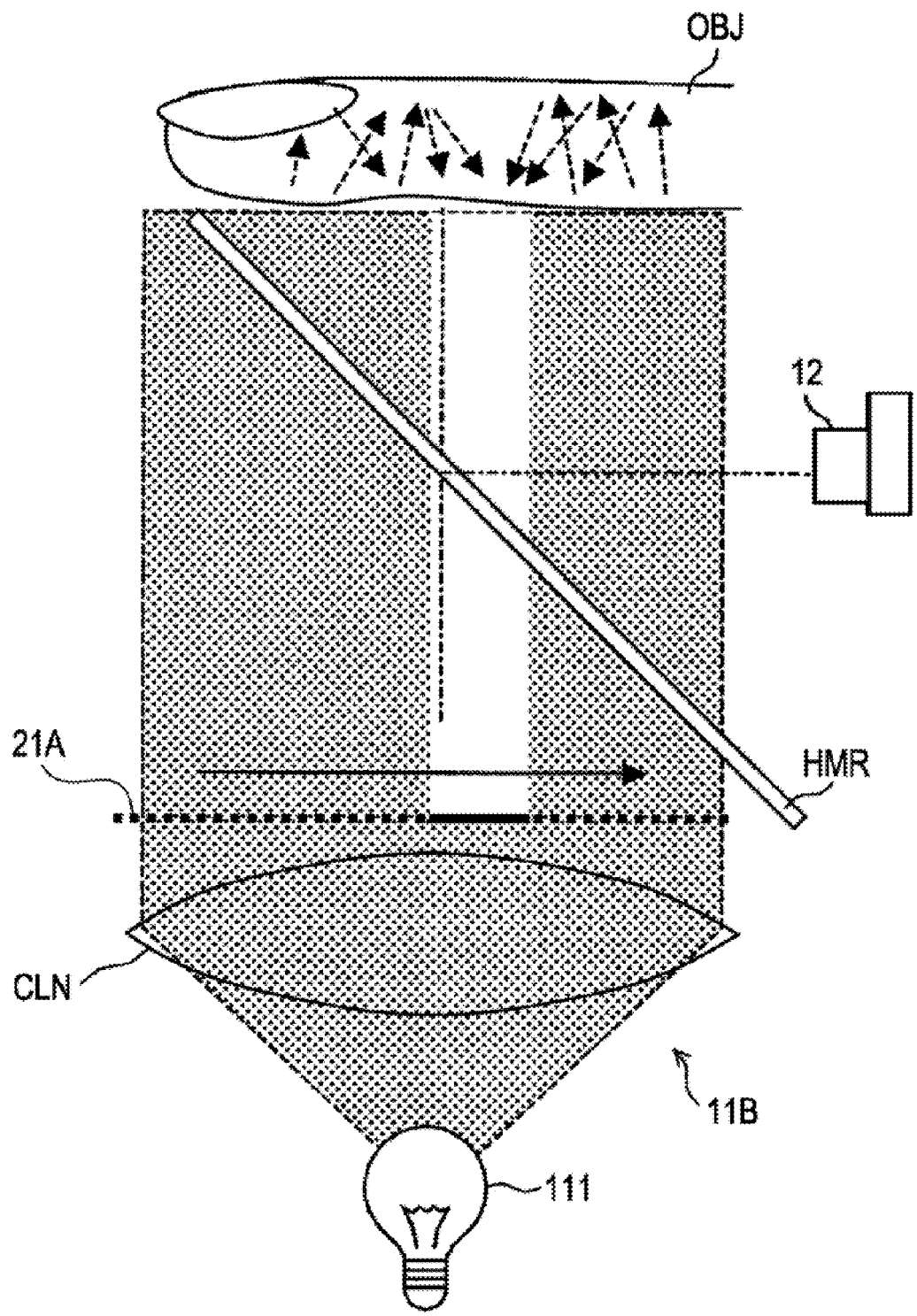
FIG. 10 is a diagram depicting a second example of relations among an object, a taking-image device and an illumination light source including an illumination region controller, according to a second embodiment.

FIG. 10 is a diagram depicting a second example of relations among an object, a image-taking device and an illumination light source including an illumination region controller, according to a second embodiment.

Figure 11:
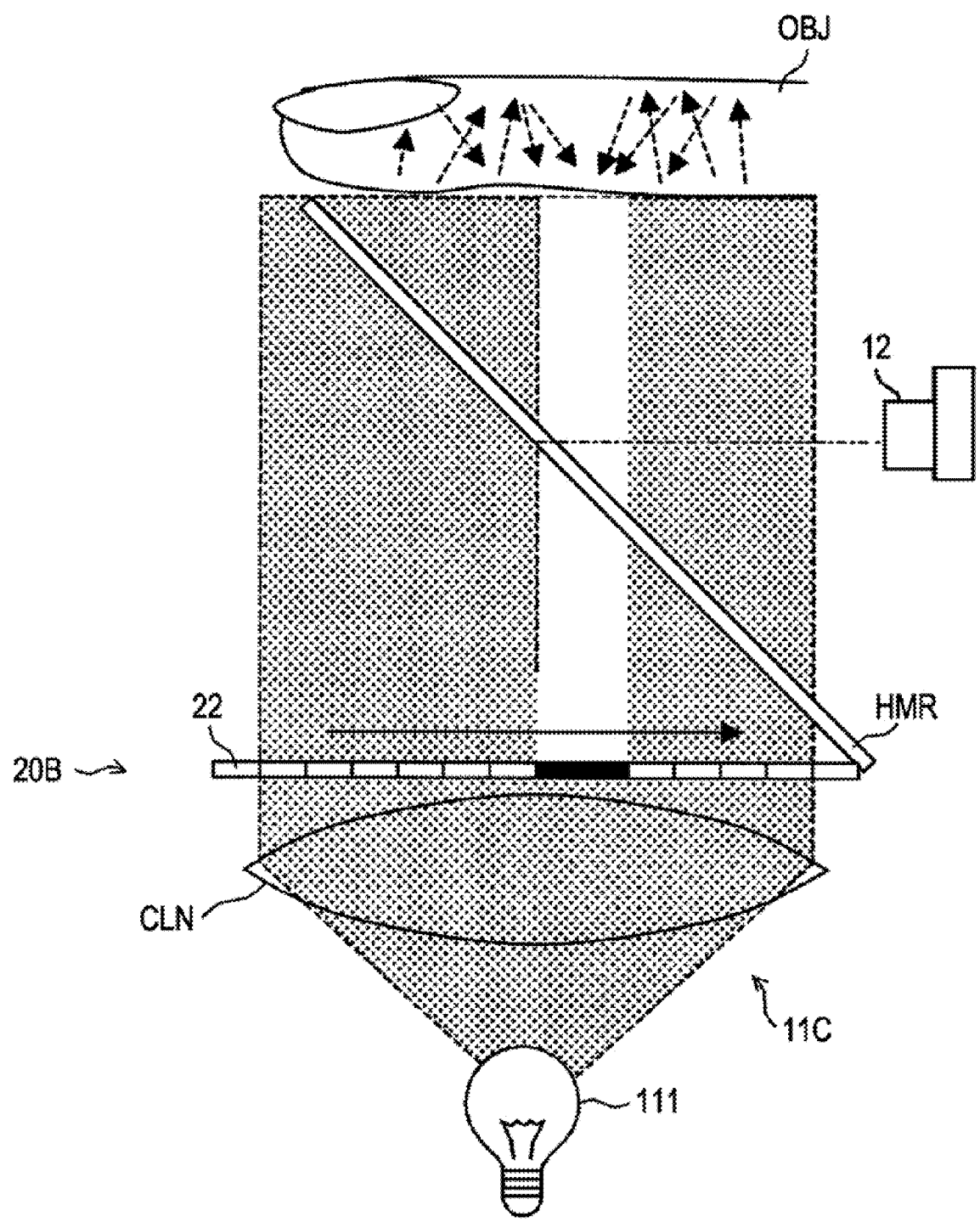
FIG. 11 is a diagram depicting a third example of relations among an object, a taking-image device and an illumination light source including an illumination region controller, according to a second embodiment.

FIG. 11 is a diagram depicting a third example of relations among an object, a image-taking device and an illumination light source including an illumination region controller, according to a second embodiment.

As shown in FIG. 10, the illumination region controller 20A can be configured by using a focal plane shutter 21A.

Alternatively, the illumination region controller 20A is not limited to the shutter, and therefore, may be another type of element, such as a liquid crystal panel shown in FIG. 11, only if it can shield certain portions of the light ray and includes a mechanism capable of changing the locations of the light shielding portions.

In the above-described examples according to an embodiment, the image-taking apparatus is configured to have a function in which, in a configuration where an object is emitted by a light ray being partially shielded, an image of the object illuminated by an indirect light resulting from this configuration is taken via the half mirror; however, this configuration leads to possibility of increasing the size of the image-taking apparatus to a certain extent.

Therefore, it is effective to realize the configuration by using a display device which incorporates therein light-sensitive elements (light sensors).

An example of an embodiment, in which a display device employing a liquid crystal, which incorporates therein the light-sensitive elements, is used, will be described.

Figure 12:
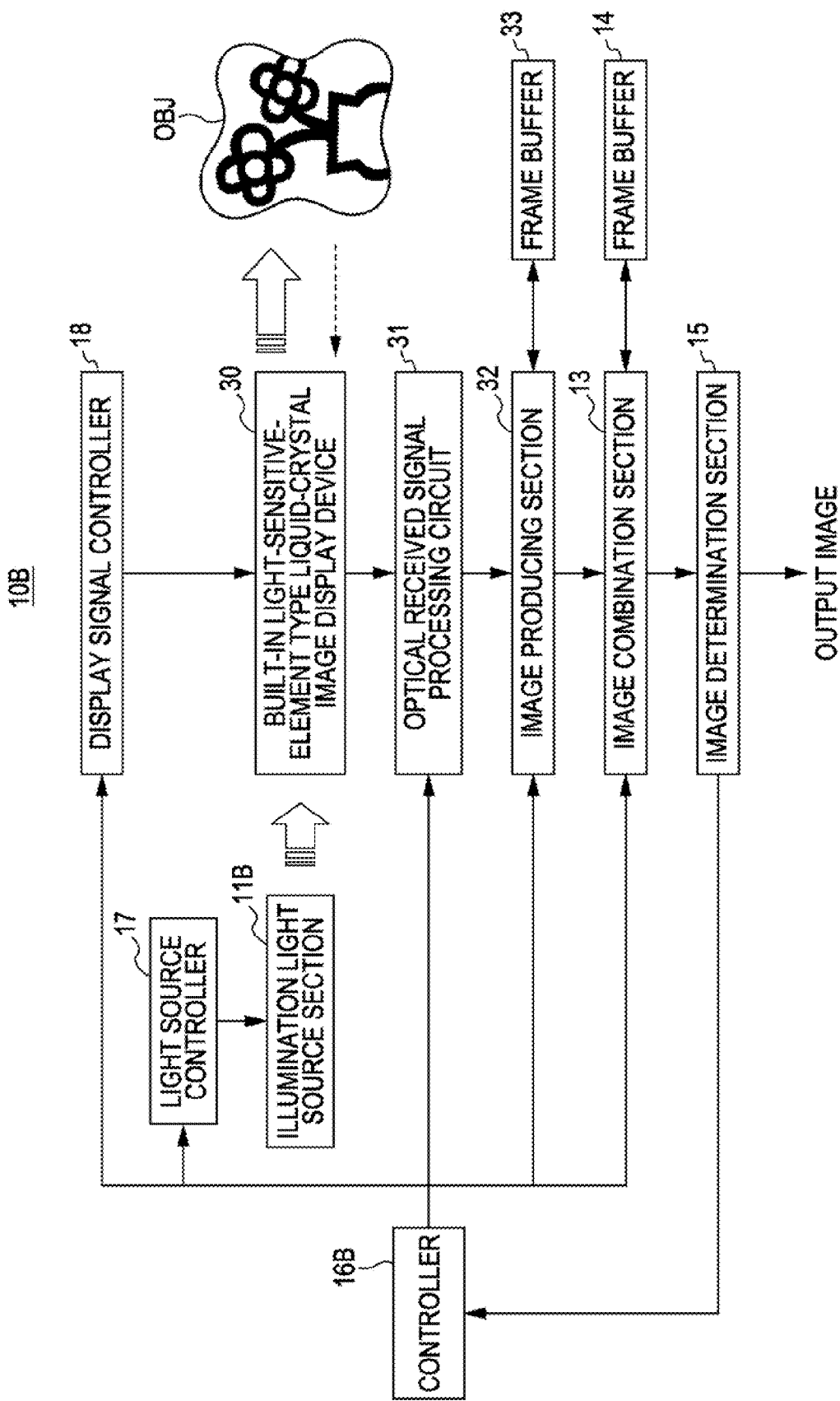
FIG. 12 is a block diagram depicting an example of a configuration of an image-taking apparatus employing a built-in light-sensitive-element type image display device, according to a third embodiment.

FIG. 12 is a block diagram depicting an example of a configuration of an image-taking apparatus employing a built-in light-sensitive-element type image display device, according to a third embodiment.

Figure 13:
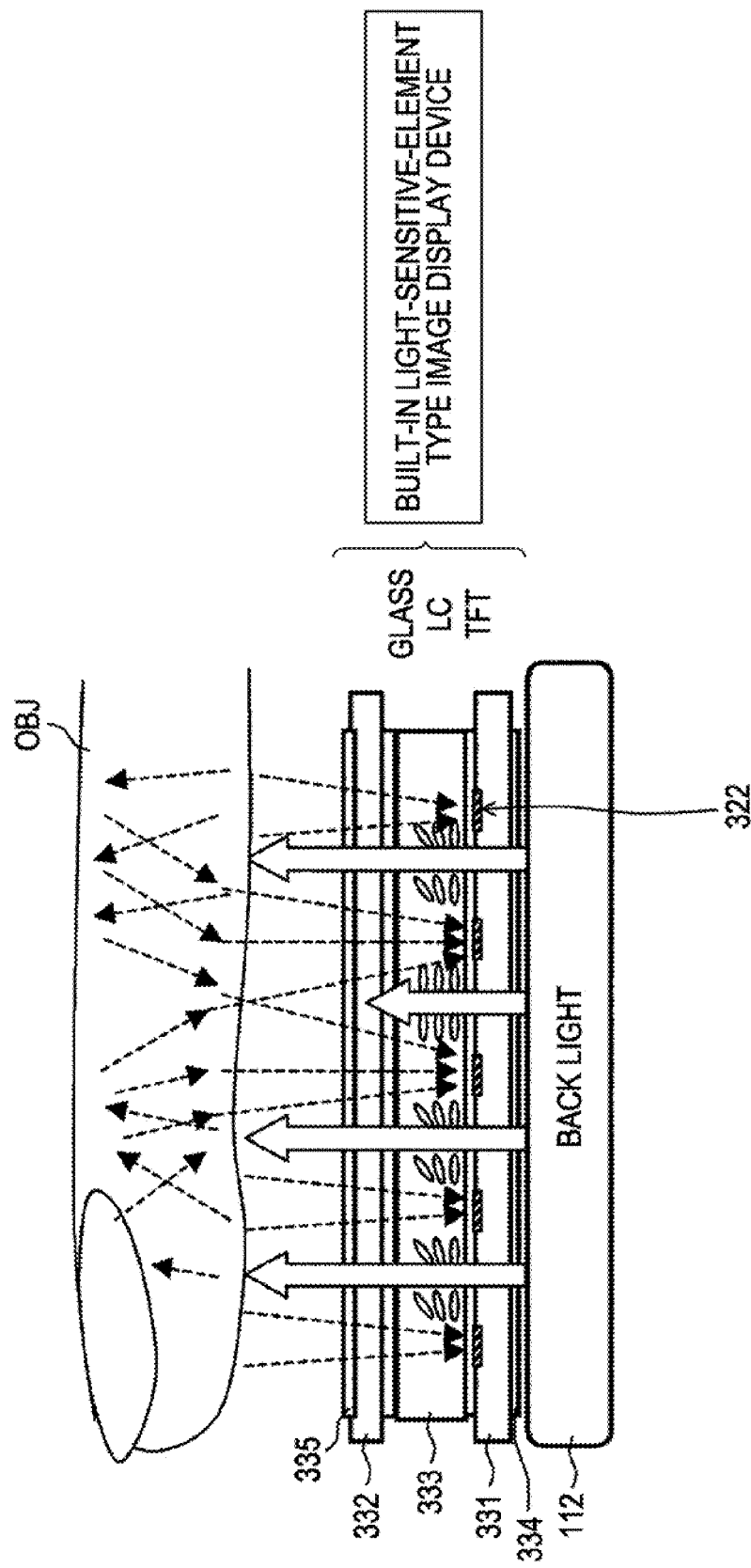
FIG. 13 is a diagram depicting a relation between a built-in light-sensitive-element type image display device and an object, according to a third embodiment.

FIG. 13 is a diagram depicting a relation between a built-in light-sensitive-element type image display device and an object.

In an image-taking apparatus 10B according to the third embodiment, a light source controller 17 including the light source control function of a controller 16B, and a display signal controller 18 for performing control of a display signal under control of the controller 16B are added to the configuration shown in FIG. 8, and further, in replacement of the illumination region controller 20A composed of the shutters and so on, a built-in light-sensitive-element type liquid-crystal image display device 30, an optical received signal processing circuit 31, an image producing section 32 and a frame buffer 33 are provided.

In addition, in the third embodiment, as shown in FIG. 13, a backlight module 112 of the built-in light-sensitive-element type liquid-crystal image display device 30 concurrently serves the function of the light source of the illumination light source section 11A.

Thus, the built-in light-sensitive-element type liquid-crystal image display device 30 encompasses functions of the image-taking device, the illumination light source, and the illumination region controller.

Figure 14:
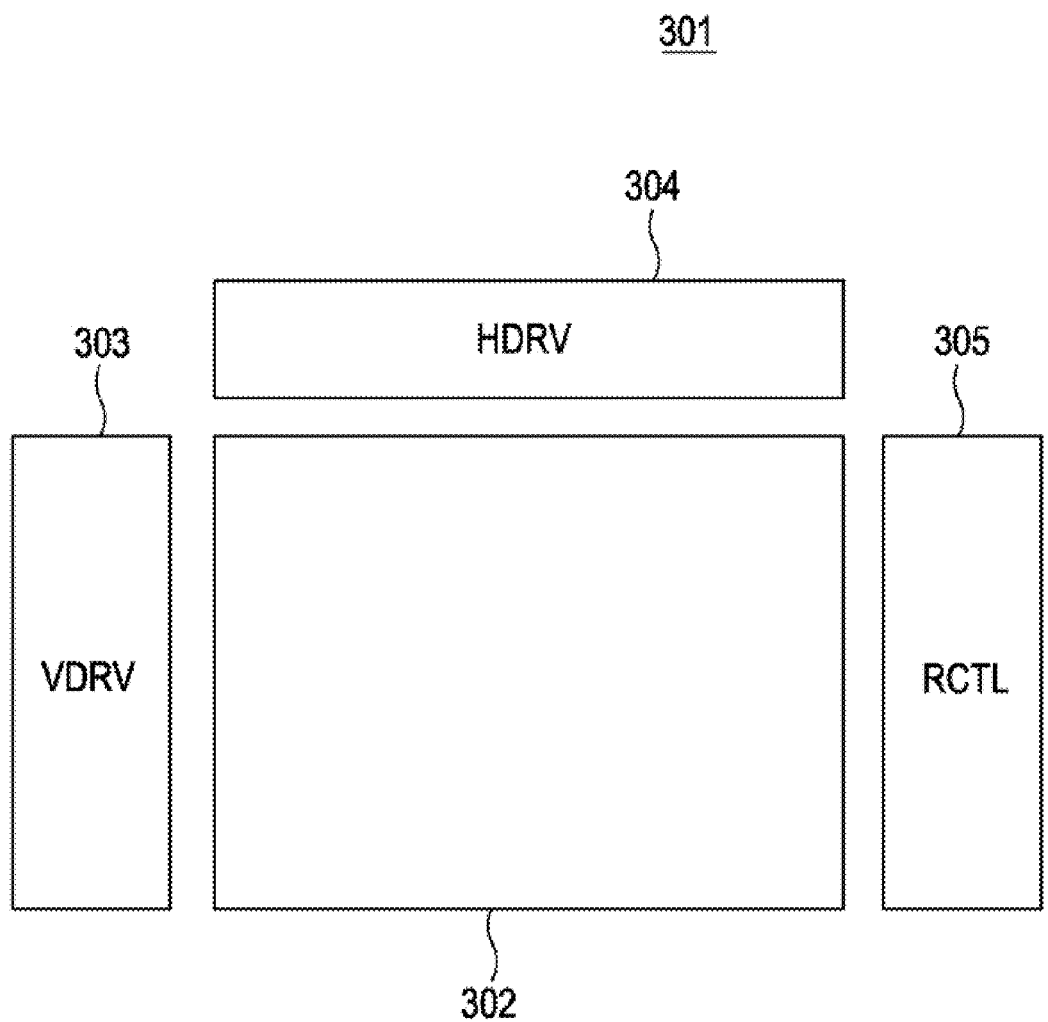
FIG. 14 is a diagram depicting an example of a configuration of a built-in light-sensitive-element type liquid-crystal image display device 30 according to a third embodiment.

FIG. 14 is a diagram depicting an example of a configuration of the built-in light-sensitive-element type liquid-crystal image display device 30 according to the third embodiment.

A liquid-crystal image display device 301 includes an effective display region 302, a vertical drive circuit (VDRV) 303, a horizontal drive circuit (HDRV) 304, and a received light control circuit (RCTL) 305.

The effective display region 302 has a plurality of pixels 320 arranged in a matrix, and each of the plurality of pixels 320 includes a display cell 321 and a light-sensitive cell 322, which are arranged in parallel with each other.

Figure 15:
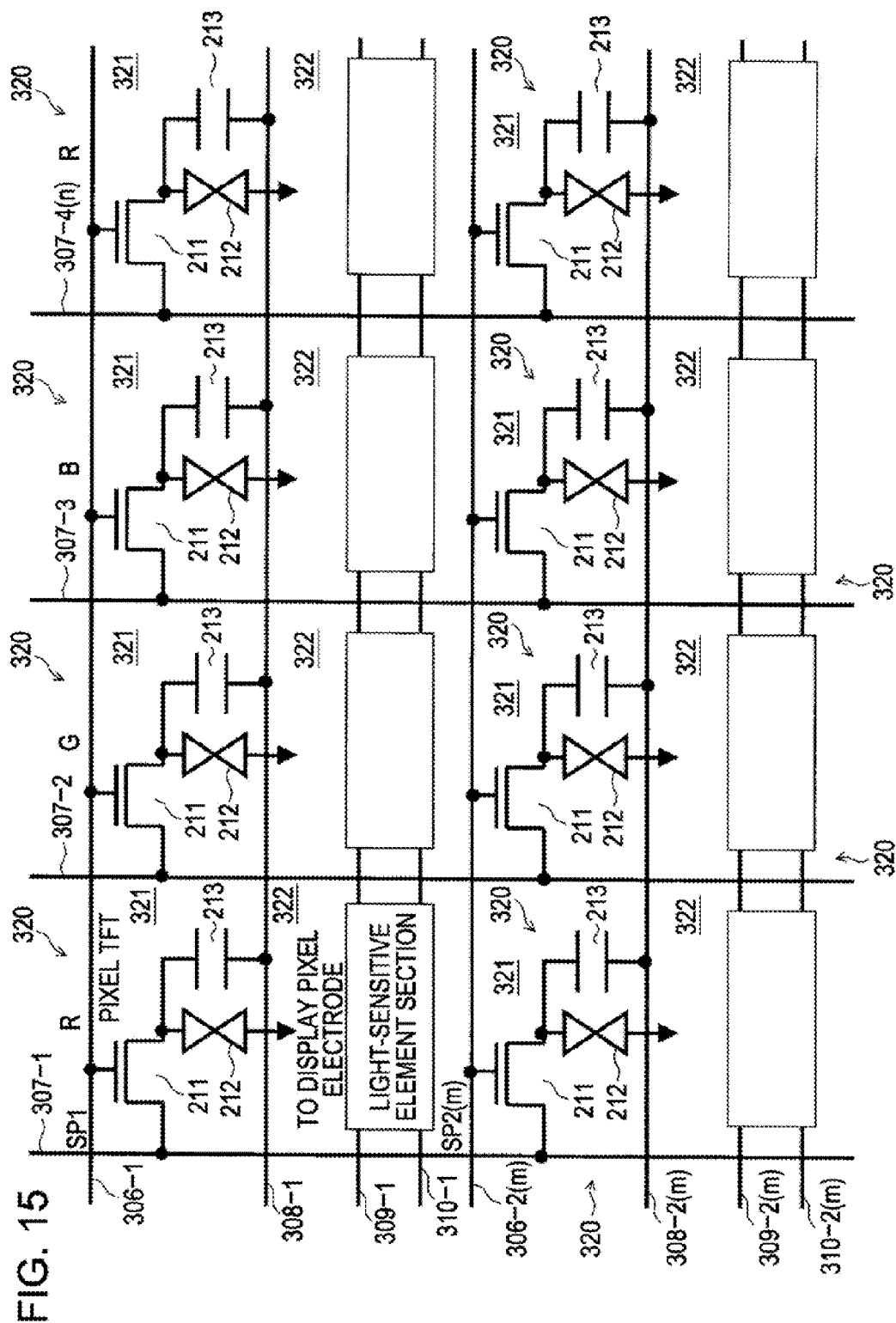
FIG. 15 is a diagram depicting an example of a configuration of an effective display region in a liquid-crystal image display device shown in FIG. 14.

As shown in FIG. 15, the display cell 321 includes a thin film transistor (TFT) 211 operating as a switching transistor, a liquid crystal cell (LC) 212 having a pixel electrode connected with a drain electrode (or a source electrode) of the TFT 211, and a retention capacity (Cs) 213 having an electrode connected with a drain electrode of the TFT 211. Corresponding to respective rows where the display cells 321 of the pixels 320 are arranged, scanning lines (gate lines) 306-1 to 306-$m$ are wired in the direction of the rows, and further, corresponding to respective columns where the display cells 321 of the pixels 320 are arranged, signal lines 307-1 to 307-$n$ are wired in the direction of the columns.

Moreover, respective gate-electrodes of the TFTs 211 included in the display cells 321 arranged in a p-th row are connected with a p-th scanning line (gate line) of the scanning lines (gate lines) 306-1 to 306-$m$, and further, respective source-electrodes (or drain-electrodes) of the TFT 211 included in the display cells 321 arranged in a q-th column are connected with a q-th signal line of the signal lines 307-1 to 307-$n$.

Furthermore, in typical liquid crystal displays, pixel retention capacity wires 308-1 to 308-$m$ are independently wired, and the retention capacities 213 are formed between these pixel retention capacity wires 308-1 to 308-$m$ and connection electrodes, respectively.

Moreover, as a common voltage VCOM, for example, a predetermined direct-current voltage, is supplied to an opposite electrode of the liquid crystal cell 212 of the display cell 321 included in each of the pixels 320 and/or another electrode of each of the retention capacities 213, through a common wire.

Alternatively, as a common voltage VCOM, for example, a voltage, the polar of which is reversed in the intervals of one horizontally scanning period (1H), is supplied to an opposite electrode of the liquid crystal cell 212 of each of the display cell 321 and another electrode of each of the retention capacities 213.

Each of the scanning lines 306-1 to 306-$m$ is driven by the vertical drive circuit 303, and further, each of the signal lines 307-1 to 307-$n$ is driven by the horizontal drive circuit 304.

The vertical drive circuit 303 receives, for example, a vertical starting signal VST, a vertical clock VCK and an enabling signal ENB, from the display signal controller 18, and then, sequentially selects the pixels 320 on a row-by-row basis, which are connected with the corresponding scanning line of the scanning lines 306-1 to 306-$m$, by vertically (i.e., in the direction of rows) scanning the respective scanning lines 306-1 to 306-$m$ at the intervals of one period of field.

That is to say, in synchronization with a scanning pulse SP-1 supplied to the scanning line 306-1 by the vertical drive circuit 303, the pixels arranged in a first row are selected, and subsequently, in synchronization with a scanning pulse SP-2 supplied to the scanning line 306-2, the pixels arranged in a second row are selected. Further subsequently, in this manner, scanning pulses SP-3 to SP-m are sequentially supplied to the scanning lines 306-3 to 306-$m$, respectively.

The horizontal drive circuit 304 receives, for example, a horizontal starting pulse HST for directing a commencement of the horizontal scanning, and horizontal clocks which have mutually reverse phases and are standards of the horizontal scanning, generates a sampling pulse, performs sequential sampling of inputted R (red), G (green) and B (blue) image data in synchronization with the generated sampling pulse, and subsequently, supplies the respective signal lines 307-1 to 307-$n$ with the resultant data signal to be written into the respective pixels 320.

Furthermore, corresponding to respective rows where the light-sensitive cells 322 of the pixels 320 are arranged, light-sensitive element control lines 309-1 to 309-m and optical received signal lines 310-1 to 310-m are wired in the direction of rows.

Figure 16:
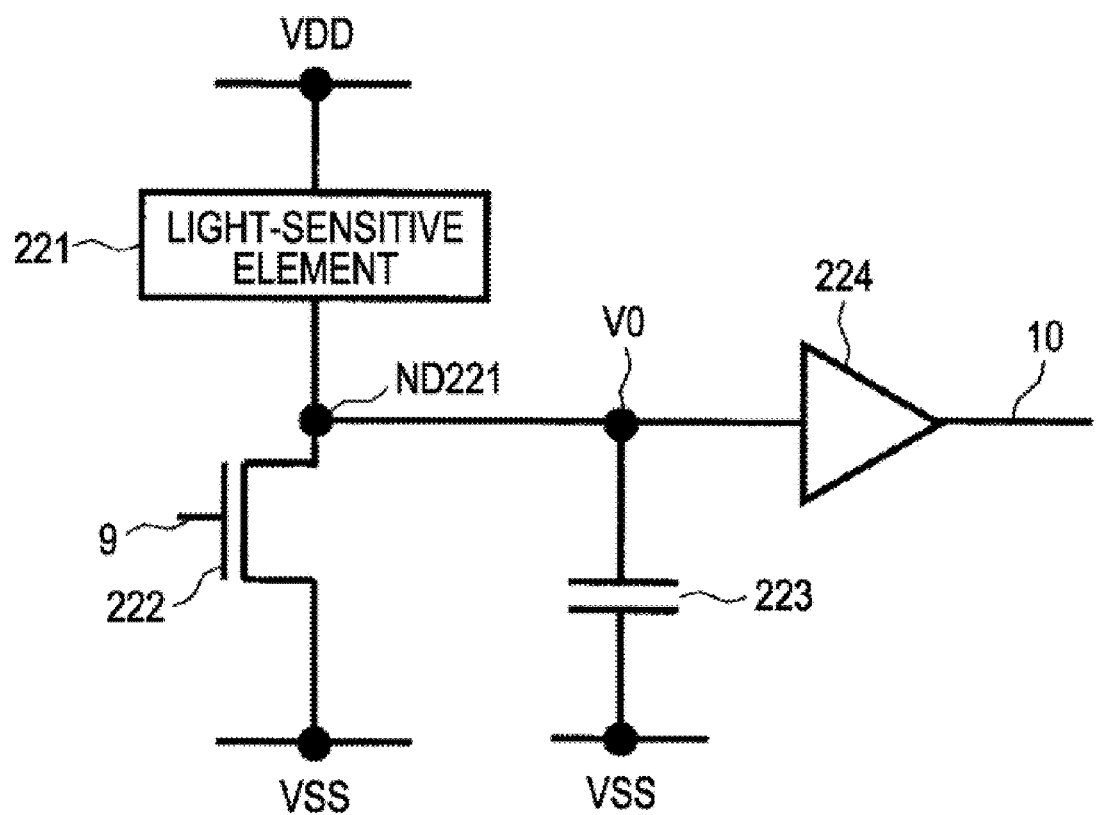
FIG. 16 is a diagram depicting an example of a fundamental configuration of a light-sensitive cell.

FIG. 16 is a diagram depicting an example of a fundamental configuration of a light-sensitive cell according to an embodiment.

The light-sensitive cell 322 includes an light-sensitive element 221, a resetting TFT 222, an optical received signal storage capacity (CO) 223, an amplifier 224 and a node ND 221, and the light-sensitive element 221 is composed of a TFT, a diode and so on.

The terminals of the light-sensitive element 221 are connected with a power supply voltage VDD and the node ND 221, respectively. The TFT 222, which is composed of, for example, an n-channel transistor, has a source electrode connected with a reference voltage VSS (e.g., an earth ground GND) and a drain electrode connected with the node ND 221. Moreover, a gate electrode of the resetting TFT 222 is connected with one of the light-sensitive element control lines 309-1 to 309-m, which is wired in the direction of the corresponding row.

Further, the terminals of the optical received signal storage capacity 223 are connected with the node ND 221 and the reference voltage VSS, respectively.

Moreover, an input terminal and an output terminal of the amplifier 224 are connected with the node ND 221 (which is also a node connected with the optical received signal storage capacity 223) and one of the optical received signal lines 310-1 to 310-m, respectively.

The light-sensitive element control lines are connected with the received light control circuit 305, and also, the optical received signal lines 310 are connected with the optical received signal processing circuit 31.

The received light control circuit 305 feeds resetting pulses to the respective light-sensitive element control lines 309-1 to 309-m at a predetermined timing, and thereby, each of the resetting TFTs 222 of the light-sensitive cells 322 is turned on during a certain period and it results in resetting of the node ND 221. In other words, for example, electric charges stored in the optical received signal storage capacity 223, connected with the node ND 221, are discharged, and the voltage of the node ND 221 is set to be a reference voltage, and consequently, the light-sensitive cell 322 is returned to an initial condition.

Under this condition, upon receipt of a certain amount of light, the light-sensitive element 221 is electrically conducted, and it results in charging of the received optical signal storage capacity 223 and increasing of the voltage of the node ND 221.

Subsequently, the voltage of the node ND 221, which is an electrical signal resulting from receipt of an amount of light, is amplified by the amplifier 224, and then, the resultant signal is outputted, as the received optical signal, to the optical received signal line 310.

Further subsequently, the optical received signal, which is transmitted via a relevant optical received signal line, is inputted to the optical received signal processing circuit 31, where the optical received signal processing circuit 31 performs a predetermined function control in response to the inputted optical received signal, and then, outputs the resultant signal to the image producing section 32.

Moreover, as shown in FIG. 13, a liquid crystal layer 333 is enclosed between a TFT substrate 331 and an opposite substrate 332, and further, for example, a backlight module 112 is mounted at the bottom side of the TFT substrate 331.

Further, a polarized filter 334 is formed on the bottom surface of the TFT substrate 331, and also, a polarized filter 335 is formed on the front surface (i.e., on the incident-light surface) of the opposite substrate 332.

In the third embodiment, the function of the illumination light source is commonly provided by the backlight module 112 of the image display apparatus.

In this configuration, certain portions of the light rays transmitting through the effective display region 302 (i.e., the liquid crystal panel) are emitted towards the object.

Therefore, certain regions on the surface of the object, which are corresponding to the portions through which the light rays are not transmitted, are not illuminated, and thus, are illuminated by lights from inside of the object, resulting from scattering of surrounding lights inside the object.

Further, light rays reflected by the surface of the object to which the illumination light rays are directly emitted, as well as light rays transmitted through the region of the object illuminated from inside of the object, are returned to the liquid crystal panel.

Subsequently, these light rays reach the light-sensitive cells 322 regardless of any polarization condition of the liquid crystal, and there, are converted into the optical received signals, and consequently, it is possible to take images of the object in accordance with the light rays returned from the object, by reading out the optical received signals from the light-sensitive cells 322.

Next, operations by elements configured as shown in FIG. 12 will be hereinafter described.

The controller 16B performs control of an illumination light source section 11B, for example, a backlight module 112 and so on, through the light source controller 17.

Subsequently, the controller 16B allocates illumination light ray emitting portions and non-illumination light ray emitting portions by driving the display cells 321 of the built-in light-sensitive-element type liquid-crystal image display device 30 through the display signal controller 18. The illumination light rays, which were emitted towards the object and have returned to the built-in light-sensitive-element type liquid-crystal image display device 30, are converted into the optical received signals by the light-sensitive cells (optical sensors) 322 in the built-in light-sensitive-element type liquid-crystal image display device 30.

The optical received signals are processed by the optical received signal processing circuit 31 and the resultant signal is outputted outside the built-in light-sensitive-element type liquid-crystal image display device 30, and further, is converted into an image by the image producing section 32. The data of this image is sent to the image combination section 13, and there, is clipped into a plurality of images so that the clipping range of each of the plurality of images can be in accordance with the condition of the illumination light source under which each of the plurality of images were taken, and then, the plurality of images are combined into an image.

Subsequently, the image determination section 15 determines whether the quality of the combined image is sufficient, or not, and in the case where the quality of the combined image is sufficient, the image determination section 15 outputs the combined image. Whereas, in the case where it is determined by the image determination section 15 that the quality of the combined image is not sufficient, in order to obtain another image of better quality, the controller 16B performs control of the illumination light source section 11B so as to perform, for example, adjustment of brightness and/or positions of non-illumination light ray emitting portions, and/or control of the built-in light-sensitive-element type liquid-crystal image display device 30 so as to perform, for example, adjustment of sensitivity of light and so on.

By selectively shielding the light rays by using a so-called liquid crystal panel, in such a manner, it is possible to vary the largeness of the light-shielding portions. Further, by varying transmission factors of the light-transmitting portions, it is possible to adjust an amount of the illumination light, and also, by varying a light intensity of the illumination light source, it is possible to adjust an amount of the illumination light.

Accordingly, by arbitrary changing the amount of the illumination light, and the largeness of the light shielding portions, i.e., the largeness of the regions of the object illuminated by light rays from inside of the object resulting from scattering of lights inside the object, in accordance with an illuminated condition of the object, it is possible to easily acquire an optimum condition for taking an image of the object.

Furthermore, the above-described control can be performed on the basis of a quality of an image resulting from combination of the plurality of taken images.

As described above, in the image-taking apparatus 10 according to an embodiment, basically, an image of the object OBJ is taken by the image-taking device 2 under the condition where the object OBJ is partially emitted by the illumination light rays.

Further, a plurality of images of the object, which were taken in conjunction with sequential changing (i.e., shifting) of the location of the illuminated areas of the illumination light rays, are combined by the image combination section 13 into one image.

Moreover, the image-taking apparatus 10 according to an embodiment, which is configured so as to specifically function as an apparatus for taking an image of the finger veins, includes the illumination light source section 11, which is located at the side of the ball of the finger and has a plurality of illumination light sources capable of being turned on or off, individually.

Moreover, the illumination light source section 11 emits a light ray towards the ball of the finger, which includes therein one or more non-illuminated areas.

Further, the image taking device 12 takes an image of the ball of the finger illuminated through one or more non-illuminated areas, and repeats these operations in conjunction with sequential shifting of the non-illuminated areas performed by the illumination light section 11.

The plurality of images obtained thereby are combined into one image by the image combination section 13. Thus, in this manner, the image of a portion of a living-body, such as the finger veins, can be obtained; and therefore, it leads to the following advantages.

It is possible to allow the indirect illumination resulting from the illumination light rays emitting from the side of the image-taking device, which has been difficult in past days in illuminating of the object in conjunction with shifting of the location of the illumination light rays, to cover all regions of the object. Owing to this, since the illumination light source can be located at the side of the image-taking device, it is enabled to make the size of the image-taking apparatus smaller, more particularly to perform designing so as to achieve flatness of the outline of the image-taking apparatus.

Further, it is possible to take images associated with all regions of the object under the indirect illumination conditions without moving the object.

Furthermore, by using the built-in light-sensitive-element type liquid-crystal image display device, as shown in FIG. 13, it is possible to make the overall outline of the apparatus significantly slim, as well as to achieve downsizing and lighter weight of the image-taking apparatus because of reduction of the number of mechanical parts to be mounted.

Additionally, the third embodiment has been described as the example in which an active-matrix type liquid crystal display apparatus using liquid crystal cells for display devices (i.e., electronic and optical devices) in individual display cells is applied. However, this is not meant to limit to the liquid crystal apparatus, but is applicable to all-round display apparatuses of various types, such as an active-matrix type EL display apparatus using electro-luminescence (EL) devices for display devices in individual pixels, a plasma display apparatus, and a field emission display (FED).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image-taking apparatus comprising:
    a processor;
    an image-taking device configured to take an image of an object, the object having a first region, a second region, and a third region;
    at least one illumination light source configured to emit an illumination ray;
    a memory device storing instructions which when executed by the processor, cause the processor, in cooperation with the image-taking device, the at least one illumination light source, and the memory device, to:
    (a) at a first point in time:
        (i) emit the illumination light ray towards the first region and the second region, wherein the illumination light ray is not illuminated towards the third region; and
        (ii) cause the image-taking device to take a first image of the object;
    (b) at a second, different point in time:
        (i) emit the illumination light ray towards the first region and the third region, wherein the illumination light ray is not illuminated towards the second region; and
        (ii) cause the image-taking device to take a second image of the object.

2. The image-taking apparatus of claim 1, wherein the instructions, when executed by the processor, cause the processor to combine the first image and the second image.

3. The image-taking apparatus of claim 2, wherein the at least one illumination light source includes a plurality of illumination light sources.

4. The image-taking apparatus of claim 3, wherein the instructions, when executed by the processor, cause the processor to change the location of the illuminated regions of the object by sequentially switching the plurality of illumination light sources into a light emitting condition or a non-light emitting condition.

5. The image-taking apparatus of claim 4, wherein the instructions, when executed by the processor, cause the processor to change a distance between centers of:
    (a) the illuminated area through which the illumination light ray is emitted onto the object; and
    (b) a non-illuminated area through which none of the illumination light ray is emitted onto the object.

6. The image-taking apparatus of claim 4, wherein the instructions, when executed by the processor, cause the processor to arbitrarily change a clipping range of the taken first image and the taken second image.

7. The image-taking apparatus of claim 2, wherein:
    (a) the at least one illumination light source includes only one illumination light source located at the side of the image-taking device; and
    (b) the image-taking apparatus includes a mechanism capable of performing control so as to selectively transmit or shield the illumination light ray originating from the illumination light source.

8. The image-taking apparatus of claim 7, wherein the instructions, when executed by the processor, cause the processor to change a distance between centers of:
    (a) the illuminated area through which the illumination light ray is emitted onto the object; and
    (b) a non-illuminated area through which none of the illumination light ray is emitted onto the object.

9. The image-taking apparatus of claim 7, wherein the instructions, when executed by the processor, cause the processor to arbitrarily change a clipping range of the taken first image and the taken second image.

10. The image-taking apparatus of claim 1, wherein the image-taking device includes an image display device including an effective display region which includes:
    (a) display cells each having a light transmitting condition capable of being controlled; and
    (b) light-sensitive cells each having a light-sensitive element, the display cells and light-sensitive cells being arranged in matrixes.

11. The image-taking apparatus of claim 10, wherein:
    (a) the image display device includes a backlight; and
    (b) a function of the at least one illumination light source is commonly provided by the backlight.

12. The image-taking apparatus of claim 1, wherein:
    (a) the illumination light ray includes an infrared light ray;
    (b) the object is a group of veins of a living-body; and
    (c) the at least one illumination light source is located at the side of the image-taking device opposite the object.

13. A method of operating an image-taking apparatus which includes an image-taking device configured to take an image of an object, the object having a first region, a second region, and a third region and at least one illumination light source configured to emit an illumination ray, the method comprising:
    (a) at a first point in time:
        (i) causing a processor to execute instructions to operate with the at least one illumination light source to emit the illumination light ray towards the first region and the second region, wherein the illumination light ray is not illuminated towards the third region; and
        (ii) causing the image-taking device to take a first image of the object;
    (b) at a second, different point in time:
        (i) causing the processor to execute the instructions to operate with the at least one illumination light source to emit the illumination light ray towards the first region and the third region, wherein the illumination light ray is not illuminated towards the second region; and
        (ii) causing the image-taking device to take a second image of the object.

14. The method of claim 13, which includes causing the processor to execute the instructions to combine the first image and the second image.

15. The method of claim 14, wherein the at least one illumination light source includes a plurality of illumination light sources.

16. The method of claim 15, which includes causing the processor to execute the instructions to operate with the at least one illumination light source to change the location of the illuminated regions of the object by sequentially switching the plurality of illumination light sources into a light emitting condition or a non-light emitting condition.

* * * * *